United States Patent
Hatakeyama et al.

(10) Patent No.: US 10,766,450 B2
(45) Date of Patent: Sep. 8, 2020

(54) SIDE AIRBAG DEVICE

(71) Applicant: Autoliv Development AB, Vårgårda (SE)

(72) Inventors: Naoki Hatakeyama, Yokohama (JP); Atsushi Murai, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 277 days.

(21) Appl. No.: 15/113,201

(22) PCT Filed: Jan. 6, 2015

(86) PCT No.: PCT/JP2015/050113
§ 371 (c)(1),
(2) Date: Jul. 21, 2016

(87) PCT Pub. No.: WO2015/111425
PCT Pub. Date: Jul. 30, 2015

(65) Prior Publication Data
US 2017/0001594 A1 Jan. 5, 2017

(30) Foreign Application Priority Data

Jan. 27, 2014 (JP) .................................. 2014-012692

(51) Int. Cl.
| | |
|---|---|
| B60R 21/262 | (2011.01) |
| B60R 21/237 | (2006.01) |
| B60R 21/231 | (2011.01) |
| B60R 21/0136 | (2006.01) |
| B60R 21/207 | (2006.01) |

(Continued)

(52) U.S. Cl.
CPC ........ B60R 21/262 (2013.01); B60R 21/0136 (2013.01); B60R 21/207 (2013.01);
(Continued)

(58) Field of Classification Search
CPC ... B60R 21/262; B60R 21/207; B60R 21/231; B60R 21/0136; B60R 21/237;
(Continued)

(56) References Cited

U.S. PATENT DOCUMENTS

| | | | |
|---|---|---|---|
| 8,439,395 B2 * | 5/2013 | Nagai | B60R 21/2346 280/729 |
| 8,757,657 B1 * | 6/2014 | Hotta | B60R 21/233 280/730.2 |

(Continued)

FOREIGN PATENT DOCUMENTS

| | | |
|---|---|---|
| CN | 102869548 B | 10/2015 |
| DE | 10 2007 000 275 A1 | 11/2007 |

(Continued)

OTHER PUBLICATIONS

PCT International Search Report—dated Mar. 31, 2015.

*Primary Examiner* — Karen Beck
(74) *Attorney, Agent, or Firm* — Dickinson Wright PLLC

(57) ABSTRACT

A side airbag device including an airbag (2); an inflator (3); and an inner tube (4) formed of a fabric and covering discharge holes (3a) of the inflator (3). The inner tube (4) protrudes toward a center of the airbag (2) in a deployed state and a first end (4b) is closed in the direction of gas discharge, and second ends (4c) that are in a vehicle height direction of the airbag (2) in the deployed state are open. The inner tube (4) is folded back at a folded-back portion (4d) inside the airbag (2) when the airbag (2) is folded in a case where the side airbag device is installed in a vehicle seat back.

7 Claims, 4 Drawing Sheets

(51) Int. Cl.
 *B60R 21/2346* (2011.01)
 *B60R 21/00* (2006.01)
(52) U.S. Cl.
 CPC .......... *B60R 21/231* (2013.01); *B60R 21/237* (2013.01); *B60R 21/2346* (2013.01); *B60R 2021/0006* (2013.01); *B60R 2021/0032* (2013.01); *B60R 2021/23123* (2013.01); *B60R 2021/23146* (2013.01)
(58) Field of Classification Search
 CPC .......... B60R 2021/23123; B60R 2021/23146; B60R 21/2346; B60R 2021/0032; B60R 2021/0006
 See application file for complete search history.

(56) References Cited

U.S. PATENT DOCUMENTS

| | | | | |
|---|---|---|---|---|
| 2007/0228701 | A1* | 10/2007 | Yamamura | B60R 21/23138 280/730.2 |
| 2007/0267853 | A1* | 11/2007 | Kato | B60R 21/207 280/730.2 |
| 2013/0033022 | A1 | 2/2013 | Yamamoto | |
| 2014/0138939 | A1* | 5/2014 | Scott | B60R 21/207 280/736 |
| 2014/0151985 | A1* | 6/2014 | Hotta | B60R 21/207 280/730.2 |
| 2016/0144821 | A1* | 5/2016 | Fujiwara | B60R 21/207 280/730.2 |
| 2016/0368449 | A1* | 12/2016 | Fujiwara | B60R 21/231 |
| 2017/0267206 | A1* | 9/2017 | Hanks | B60R 21/26 |
| 2018/0222434 | A1* | 8/2018 | Nukaya | B60R 21/23138 |
| 2019/0118759 | A1* | 4/2019 | Kobayashi | B60R 21/23138 |

FOREIGN PATENT DOCUMENTS

| | | |
|---|---|---|
| EP | 2 562 054 B1 | 9/2014 |
| JP | 2005-186891 | 7/2005 |
| JP | 2007-308020 | 11/2007 |
| JP | 2009-255706 | 11/2009 |
| JP | WO 2011/132316 A1 | 10/2011 |
| JP | 2012-056506 | 3/2012 |

* cited by examiner

SIDE AIRBAG DEVICE

CROSS REFERENCE TO RELATED APPLICATIONS

This application claims priority to Japanese Patent Application No. 2014-012692, filed on Jan. 27, 2014 and PCT/JP2015/050113, filed on Jan. 6, 2015.

FIELD OF THE INVENTION

The present invention relates to a side airbag device provided in a motor vehicle to protect an occupant particularly when the vehicle is impacted from a side surface thereof (hereinafter such an impact will be referred to as a side impact).

BACKGROUND

A side airbag device that protects an occupant from an impact in the event of side impacts is generally provided inside a lateral portion close to the window side of an occupant seat backrest (hereinafter referred to as a seat back) of a seat.

Such a side airbag device has a configuration in which an inflator operates according to a signal output from a sensor that has detected an impact in the event of a side impact to generate inflation gas and an airbag is deployed by the generated gas.

In a side airbag device having such a configuration, an inner tube that changes the direction in which gas discharged from an inflator flows is generally provided. For example, see the diffuser of Japanese Patent Application Publication No.

The inner tube is typically formed in a tubular form by sewing or melt-bonding. When these sewing portions or melt-bonding portions are directly exposed to the gas discharged from the inflator, the heat-associated damage may increase.

However, conventionally, the above-mentioned problem has not been addressed.

SUMMARY AND INTRODUCTORY DESCRIPTION

An object of the present invention is to solve a problem that heat-associated damage increases when the sewing portions or the melt-bonding portions of the inner tube are directly exposed to gas discharged from the inflator, which has not been addressed.

The present invention is made to solve the above-mentioned problem. That is, the present invention solves the problem with a configuration in which sewing portions or melt-bonding portions of an inner tube are not directly exposed to gas discharged from an inflator.

That is, a side airbag device of the present invention is mainly characterized in that the device includes: an airbag; an inflator provided in the airbag so as to receive an output signal from a sensor in the event of a side impact and supply gas to the airbag in a folded state, thereby deploying the airbag; and an inner tube formed of a fabric and provided to cover discharge holes of the inflator in order to change a direction of a flow of gas discharged from the inflator, wherein the inner tube is structured such that the inner tube protrudes toward a center of the airbag in a deployed state and that a first end that is in a direction, in which the gas is discharged from the inflator, is closed, and second ends that are in a vehicle height direction of the airbag in the deployed state and intersecting the discharge direction of the gas, which is discharged from the discharge holes of the inflator, are open, and the inner tube is folded back at a folded-back portion inside the airbag when the airbag is folded in a case where the side airbag device is installed in a seat back of a vehicle seat.

In the present invention, the inner tube is folded back at a folded-back portion inside the airbag when the airbag is folded.

Therefore, the sewing portions or the melt-bonding portions that forms the first end of the inner tube are not directly exposed to the gas discharged from the inflator in an initial stage of deployment, and the first end of the inner tube is effectively prevented from being damaged by the gas.

In the present invention, when the airbag includes a protruding portion in which the inflator is disposed and a body portion, since the volume of the body portion required for protecting an occupant decreases, the deployment speed of the airbag increases.

In this case, when a side airbag device is installed in a seat back of a seat, the protruding portion of the airbag, when seen from a lateral side of a vehicle, preferably has such a shape that the protruding portion overlaps a frame of the vehicle seat. In this case, since the size of a deployment portion of the airbag on the frame of the seat back decreases, the volume of the airbag can be reduced and the size of a deployment portion for an occupant protection area can be increased. Further, the volume of the airbag can be decreased appropriately and the deployment speed of the airbag can be increased.

In the present invention, since the first end of the inner tube is folded back at the folded-back portion inside the airbag, the sewing portions or the melt-bonding portions that form the first end of the inner tube are not directly exposed to the gas discharged from the inflator in an initial stage of deployment. Therefore, it is possible to prevent the first end of the inner tube from being damaged by the gas and to perform the deployment of the airbag effectively.

BRIEF DESCRIPTION OF DRAWINGS

FIG. 1(a) and FIG. 1(b) are drawings illustrating a state in which an airbag of a side airbag device of the present invention is deployed, in which FIG. 1(a) is a view when seen from the direction of a side surface of a vehicle, and FIG. 1(b) is a cross-sectional view along line A-A in FIG. 1(a).

DETAILED DESCRIPTION

Conventionally, a problem that heat-associated damage increases and a deployment behavior of an airbag changes when a sewing portion or a melt-bonding portion that forms a first end of an inner tube is directly exposed to gas discharged from an inflator in an initial stage of deployment has not been adequately addressed.

The present invention solves the above-mentioned problem with a configuration in which the first end of the inner tube is folded back at a folded-back portion inside the airbag.

Figure 1A:
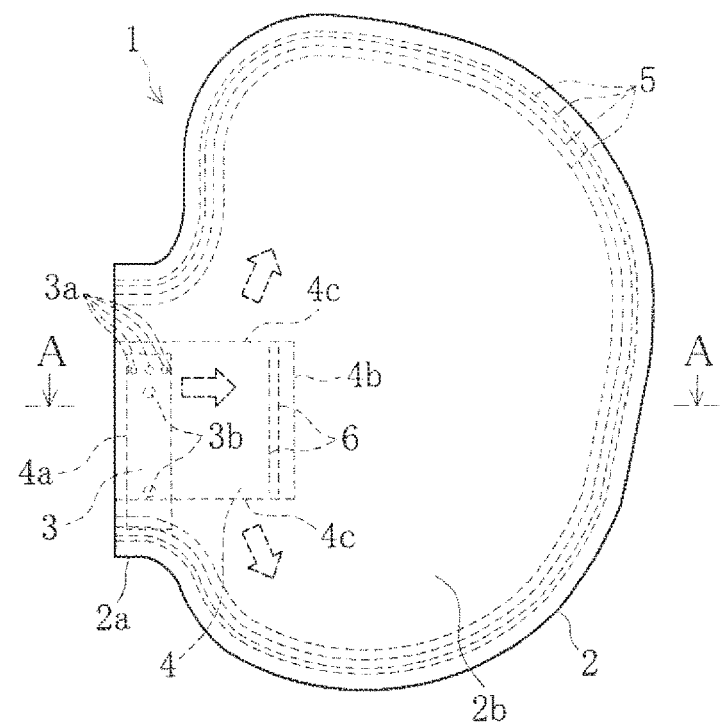
Figure 1B:
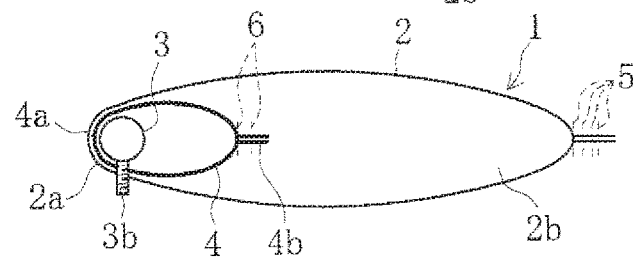
Figure 2:
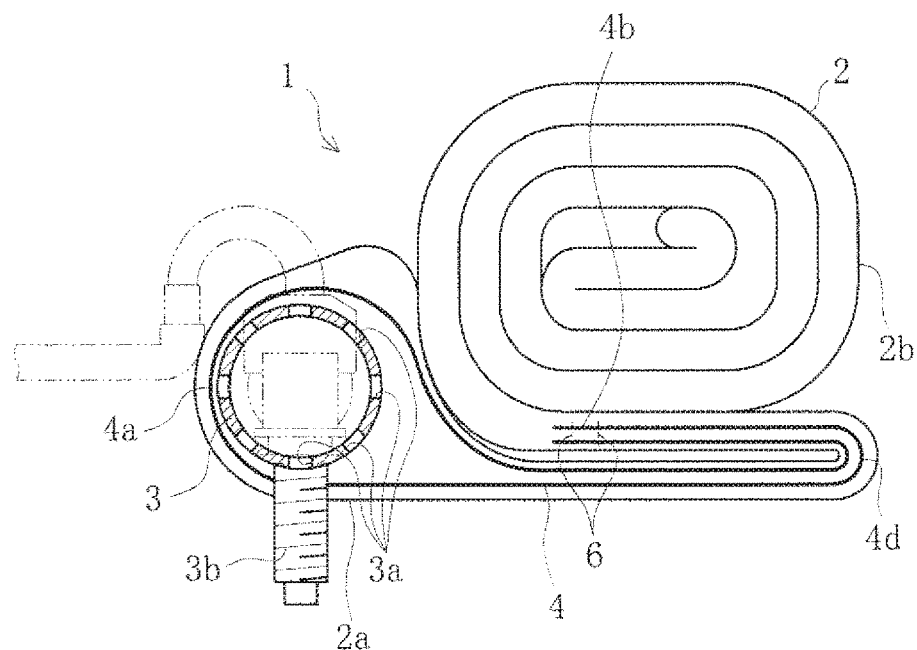
FIG. 2 is a drawing illustrating a folded state of the airbag of the side airbag device of the present invention and is a cross-sectional view at a discharge hole position of the inflator.
Figure 3:
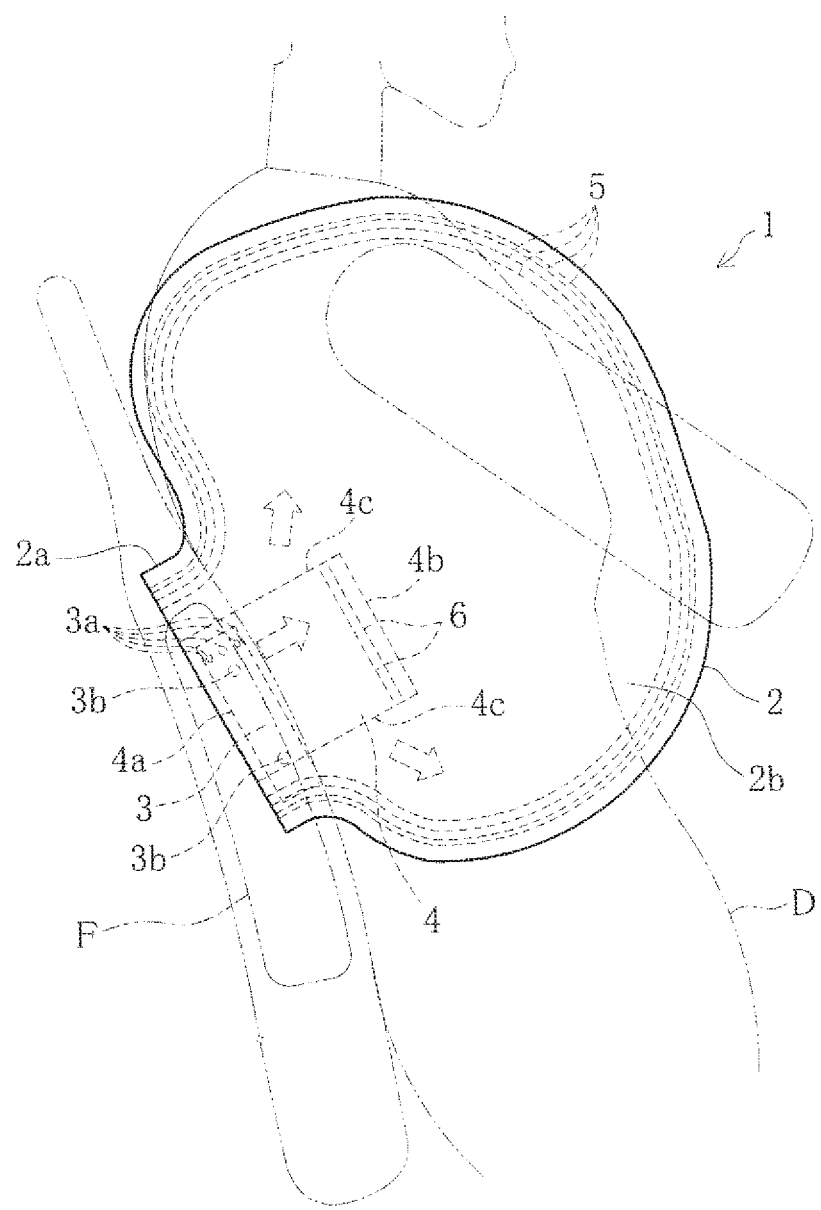
FIG. 3 is a drawing illustrating a world side impact dummy (WorldSID: hereinafter referred to simply as a dummy) in a state of sitting on a seat and a relative positional relation in a state in which an airbag of the side airbag device of the present invention is deployed.

The present invention will be described with reference to the accompanying drawings. FIG. 1 to FIG. 3 are drawings for describing an example of a side airbag device of the present invention.

A side airbag device 1 in accordance with the present invention may be provided inside a lateral portion close to the window side of a seat back (SB). The side airbag device 1 is configured to receive a signal output from a sensor in the event of side crashes particularly to deploy an airbag 2 folded in a roll form or a bellows form toward a vehicle front side between an occupant sitting on a seat and a vehicle lateral portion to protect the occupant.

The side airbag device 1 includes the airbag 2, an inflator 3 that receives a signal output from a sensor to discharge inflation gas, and an inner tube 4 that is formed of a fabric and changes the direction in which the gas discharged from the inflator 3 flows.

The airbag 2 is formed in a bag form by a sewing portion 6 constructed by sewing the entire circumference of two base fabric sheets, for example. The airbag 2 includes a rectangular protruding portion 2a that overlaps a frame F of the seat and a body portion 2b that protects an occupant during deployment, and the inflator 3 is disposed inside the protruding portion 2a.

The inflator 3 has a cylindrical shape as illustrated in FIG. 1 and FIG. 3, for example, and is configured such that inflation gas is discharged into the airbag 2 from discharge holes 3a formed in an outer surface of the inflator 3. Two fixing bolts 3b protrude from the outer surface of the inflator 3 with an appropriate interval in a longitudinal direction of the inflator 3, and the inflator 3 is provided in the frame F in a lateral end of the seat back SB using these bolts 3b.

The inner tube 4 is provided so that one end 4a is attached to the protruding portion 2a of the airbag 2 in a state of covering at least the discharge holes 3a of the inflator 3 and the other end 4b protrudes toward the center of the airbag 2 in the deployed state. In this case, the inner tube 4 protrudes toward the center of the airbag 2 while avoiding the ribs of a dummy D sitting on the seat, as shown in FIG. 3.

Moreover, the other end (hereinafter a first end) 4b of the inner tube 4, positioned in the direction in which the gas discharged from the inflator 3 flows is closed by a sewing portion 6, for example. On the other hand, upper and lower ends (hereinafter referred to as second ends) 4c positioned on the upper and lower side in a vehicle height direction of the airbag 2 in the deployed state (for example, in a direction vertical to the first end 4b), intersecting the discharge direction of the gas discharged from the discharge holes 3a of the inflator 3. Gas is discharged from these second ends 4c toward portions of the body portion 2b of the airbag 2 corresponding to the shoulder and the belly of the dummy D.

When the side airbag device 1 is provided in the seat back SB of the seat of a vehicle, although the airbag 2 is folded in a roll form as illustrated in FIG. 2, for example, the present invention is characterized in that such a state as described below is created during folding of the airbag 2.

In the present invention, the inner tube 4 is folded back at a folded-back portion 4d inside the body portion 2b of the airbag 2 so that the first end 4b is positioned inside the body portion 2b of the airbag 2.

For example, in the example of FIG. 2, the inner tube 4 is folded together with two base fabrics of the airbag 2 so that the first end 4b of the inner tube 4 faces the inflator 3, and in the folded state, the first end 4b is positioned in the body portion 2b of the airbag 2.

With this configuration, even when the inflator 3 receives a signal output from a sensor to discharge gas from the discharge holes 3a in the event of side crashes, the first end 4b is exposed to the gas after the folded-back portion 4d of the inner tube 4 is first exposed to the gas.

Therefore, it is possible to reduce the damage to the sewing portion 6 that forms the first end 4b in the initial stage of deployment to effectively prevent the gas-associated damage to the inner tube 4. Thus, gas can be reliably discharged toward the shoulder and the belly of the dummy D.

The present invention is not limited to the above-mentioned example, but naturally, the embodiment may be appropriately modified within the scope of the technical ideas recited in the claims. The side airbag device described above is a preferred example of the present invention, and other embodiments may be embodied and implemented in various methods.

For example, the manner for forming the first end 4b of the inner tube 4 is not limited to sewing, and melt-bonding or the like may be used as long as the first end 4b can be formed.

A longitudinal cross-sectional shape of the inner tube 4 is not limited to a rectangular shape, and may have such a shape that a branch portion protrudes toward the shoulder and the belly of the dummy D in the vertical directions from the outer surface of the longitudinal cross-sectional shape.

The direction in which the second end 4c is provided is not limited to the direction vertical to the first end 4b as long as the direction intersects the discharge direction of the gas discharged from the discharge holes 3a of the inflator 3 and gas can be discharged toward the shoulder and the belly of the dummy D.

Figure 4A:
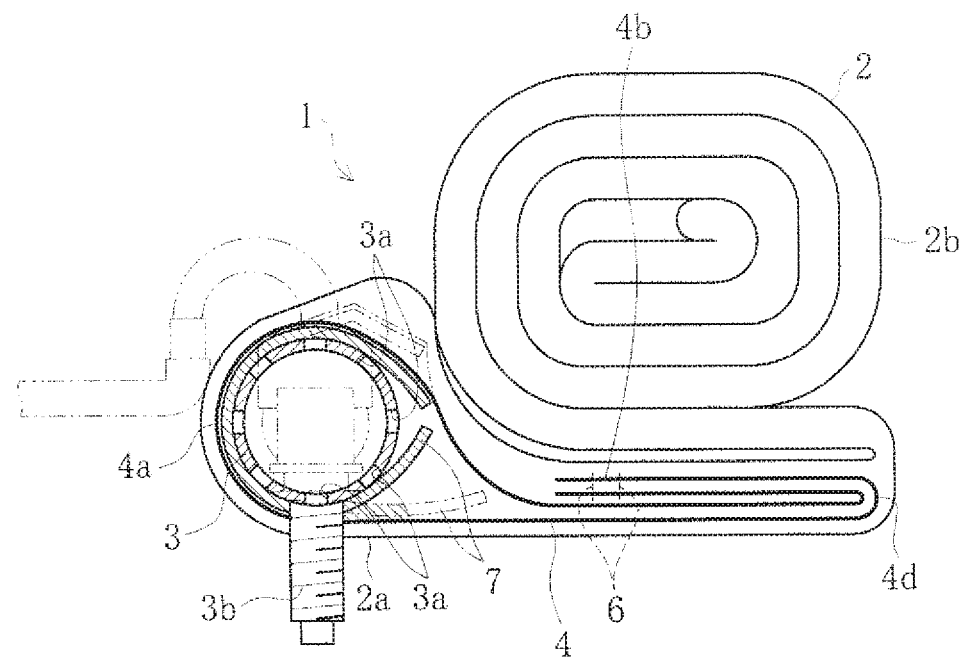
FIGS. 4(a) and 4(b) are similar to the drawing of FIG. 2, illustrating another folded-back state of the inner tube.
Figure 4B:
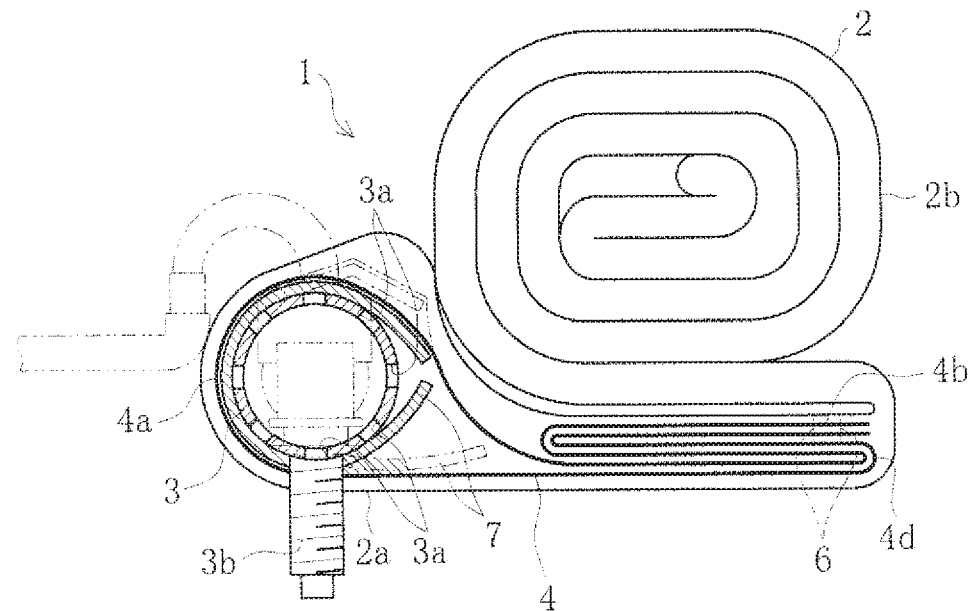

A state in which the first end 4b of the inner tube 4 is positioned inside the body portion 2b of the airbag 2 is not limited to the state illustrated in FIG. 2. For example, as illustrated in FIG. 4(a), the folded-back portion 4d may be folded back so that only the inner tube 4 in the body portion 2b adjacent to the protruding portion 2a of the airbag 2 faces the inflator 3. Moreover, as illustrated in FIG. 4(b), the inner tube 4 may be further folded back at the folded-back portion 4d from the state of FIG. 4(a).

Figure 5A:
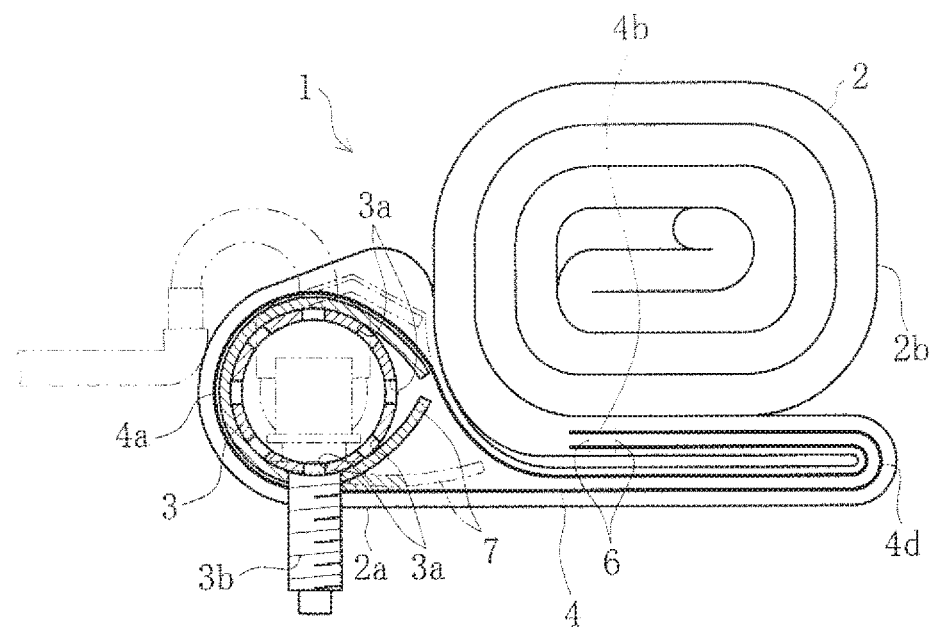
FIG. 5(a) is a drawing illustrating another example of FIG. 2
Figure 5B:
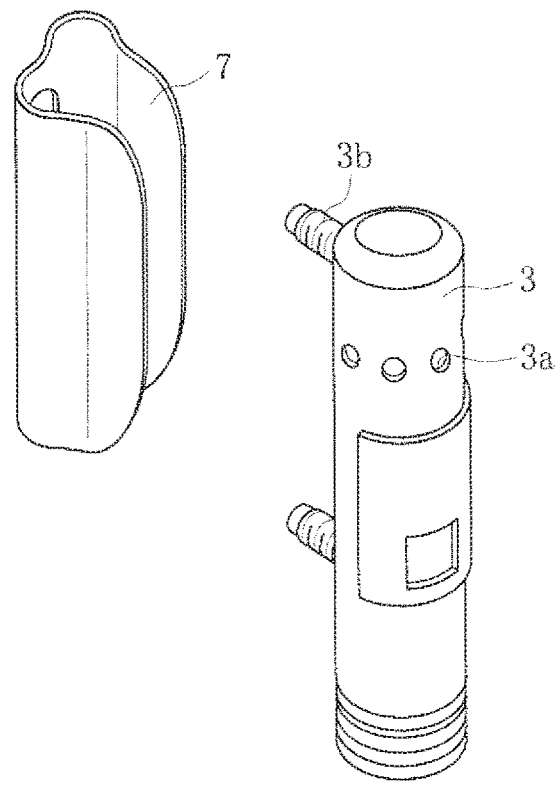
FIG. 5(b) is a perspective view of an inflator and a deflector attached to the inflator.

As illustrated in FIG. 5, a metallic deflector 7 may be disposed between the first end 4a of the inner tube 4 and the inflator 3 so as to cover the discharge holes 3a portion of the inflator 3 when the side airbag device is installed in the seat back SB. In the other example illustrated in FIG. 5, the gas discharged from the inflator 3 is guided to the body portion 2b of the airbag 2 after expanding the deflector 7 (see an imaginary line in FIG. 5(a)). In this case, the flow of discharged gas concentrates even more toward the folded-back portion 4d, but this folding-back structure enables the airbag 2 to be deployed more quickly while preventing the damage to the inner tube 4 more effectively.

While the above description constitutes the preferred embodiment of the present invention, it will be appreciated that the invention is susceptible to modification, variation and change without departing from the proper scope and fair meaning of the accompanying claims.

The invention claimed is:

1. A side impact airbag device for installation in a seat back of a vehicle seat and adapted to deploy in response to an output signal from a sensor in the event of a side impact comprising:
    an airbag;
    an inflator provided in the airbag so as to supply an inflation gas to the airbag in a folded state, thereby deploying the airbag to a deployed state; and
    an inner tube formed of a fabric and having an end provided to cover discharge holes of the inflator in order to change a direction of a flow of the gas discharged from the inflator, wherein
    a first end of the inner tube is closed and protrudes toward a center of the airbag in the deployed state, and upper and lower ends defining second ends are open and separated in a vehicle height direction of the airbag in the deployed state,
    the inner tube is folded back at a folded-back portion inside the airbag when the airbag is in the folded state, and is unfolded when the airbag is in the deployed state,
    the inner tube is folded back together with a portion of two base fabrics of the airbag such that the portion of one of the two base fabrics is positioned between the folded-back portion and an unfolded portion of the inner tube in the folded state,
    the airbag includes two different portions defining a protruding portion, in which the inflator is disposed, and a body portion, in which the folded-back portion and the second ends of the inner tube are positioned,
    the first end and the second ends of the inner tube extend into the body portion beyond a front-most surface line of the seat back in a vehicle length direction, and
    only the inner tube in the body portion adjacent to the protruding portion of the airbag faces the inflator when the airbag is folded.

2. The side airbag device according to claim 1 further comprising;
    the direction in which the second ends of the inner tube intersect the discharge direction of the gas discharged from the discharge holes of the inflator, is perpendicular to the first end.

3. The side airbag device according to claim 1, wherein when seen from a lateral side of the vehicle, the protruding portion is shaped to overlap a frame of the vehicle seat.

4. The side airbag device according to claim 1 further comprising the first end is closed by stitching.

5. The side airbag device according to claim 1 further comprising the folded back portion of the inner tube forms more than one layer.

6. The side airbag device according to claim 1 further comprising a metal deflector attached to the inflator for affecting the discharged gas.

7. A side impact airbag device for installation in a seat back of a vehicle seat and adapted to deploy in response to an output signal from a sensor in the event of a side impact comprising:
    an airbag;
    an inflator provided in the airbag so as to supply inflation gas to the airbag in a folded state, thereby deploying the airbag to a deployed state; and
    an inner tube formed of a fabric and having an end provided to cover discharge holes of the inflator in order to change a direction of a flow of the gas discharged from the inflator, wherein
    a first end of the inner tube is closed and protrudes toward a center of the airbag in the deployed state, and upper and lower ends defining second ends are open and separated in a vehicle height direction of the airbag in the deployed state,
    the inner tube is folded back at a folded-back portion inside the airbag when the airbag is in the folded state, and is unfolded when the airbag is in the deployed state,
    the inner tube is folded back over the inner tube such that a surface of the folded-back portion of the inner tube contacts another surface of the inner tube which is not the folded-back portion when the airbag is in the folded state,
    the airbag includes two different portions defining a protruding portion, in which the inflator is disposed, and a body portion, in which the folded-back portion and the second ends of the inner tube are positioned,
    the first end and the second ends of the inner tube extend into the body portion beyond a front-most surface line of the seat back in a vehicle length direction, and
    only the inner tube in the body portion adjacent to the protruding portion of the airbag faces the inflator when the airbag is folded.

* * * * *